(12) United States Patent
Kadah

(10) Patent No.: US 7,804,270 B2
(45) Date of Patent: Sep. 28, 2010

(54) MOTOR START CIRCUIT WITH CAPACITIVE DISCHARGE PROTECTION

(75) Inventor: Andrew S. Kadah, Manlius, NY (US)

(73) Assignee: International Controls and Measurements Corp., North Syracuse, NY (US)

( * ) Notice: Subject to any disclaimer, the term of this patent is extended or adjusted under 35 U.S.C. 154(b) by 399 days.

(21) Appl. No.: 12/047,721

(22) Filed: Mar. 13, 2008

(65) Prior Publication Data

US 2009/0230914 A1     Sep. 17, 2009

(51) Int. Cl.
*H02H 5/04*     (2006.01)
(52) U.S. Cl. .................... 318/782; 318/778; 318/781
(58) Field of Classification Search ............. 318/811, 318/817, 778, 782, 781, 794, 795, 786; 320/166
See application file for complete search history.

(56) References Cited

U.S. PATENT DOCUMENTS 6,847,193 B2 *  1/2005  Sakuragi ................ 320/166
6,982,539 B1     1/2006  Ward

FOREIGN PATENT DOCUMENTS

DE       10230728 A1    4/2003
RU        2256993 C2    7/2005

\* cited by examiner

*Primary Examiner*—Karen Masih
(74) *Attorney, Agent, or Firm*—Bernhard P. Molldrem, Jr.

(57) ABSTRACT

A motor start circuit for an AC induction motor employs a DC relay whose NC contacts are placed in series with the start capacitor. A half full-wave rectifier arrangement has an AC input connected to the junction of the relay switch and the start capacitor, and DC outputs applied across the relay actuator coil. In the event of intermittent application of power to the motor, any residual charge on the start capacitor will feed current to the actuator coil to hold the relay switch open until the residual charge has decayed sufficiently, to avoid damage to the motor from capacitive discharge. A high magnetic retentivity core can be used to hold the relay off for sufficient time for stored energy to dissipate.

12 Claims, 2 Drawing Sheets

MOTOR START CIRCUIT WITH CAPACITIVE DISCHARGE PROTECTION

BACKGROUND OF THE INVENTION

The present invention relates to single-phase AC induction motors, and is more particularly concerned with a motor start circuit that controls the flow of AC current to the motor's auxiliary or start winding when the motor is started up.

At start up, AC single-phase induction motors require a starting mechanism to rotate the magnetic field of the field windings, so as to generate sufficient torque to start the rotor. The starting mechanism enables the rotor to overcome the static forces associated with accelerating the rotor and with the load imposed on it. Different motors require different amounts of additional torque at start up. Also, the amount of auxiliary current required depends on initial load conditions, and on the quality of the AC power.

The typical AC induction motor armature is equipped with two sets of windings, namely, one or more main or run windings for driving the motor at a normal operating speed, and an auxiliary or start winding to create the required starting torque. In order to provide the necessary rotating magnetic field for start-up, a phase shift capacitor is connected in series with the start winding. During start-up, both the run winding(s) and the auxiliary or start winding(s) are energized to bring the motor up to a sufficient operating speed. At that point, the start or auxiliary winding either drops out of circuit so that the motor operates on the run windings alone, or can be connected to a run capacitor but cut off from the start capacitor. In the event that a heavy load is encountered, and the motor rpm drops below its design operating speed, or stalls, the auxiliary winding can be cut back in as needed to increase motor torque, and overcome the increased load.

A control circuit or control device is employed to turn off the start current to the start winding once the motor has achieved a sufficient operating speed. This may involve a timer, a magnetic field sensor, or another arrangement that is sensitive to motor load or motor speed.

In a typical AC induction motor, the start capacitor is connected in series with a relay switch between the start winding and one of the main power conductors. This typically involves the relay normally closed (NC) contacts, so that power is applied immediately to the auxiliary winding at start up. A relay coil then pulls the relay switch open after operating speed is achieved to cut off the auxiliary current.

A problem can arise from intermittent application of power to the motor, i.e. to the main AC power conductors. If the power is switched on and off and back on, power to the relay coil will be intermittent, and this will cause the relay switch to chatter, i.e., to fluctuate between on and off. In a worst case, if the power is cut in and then out, the start capacitor will be left fully charged, i.e., ±165 volts in the case of 110 VAC (RMS). When the relay coil releases the switch, the NC contacts close, and the entire charge on the start capacitor will discharge through the relay contacts and then through the low-ohmage run and start windings. This can create a current of several hundred amperes for a short period of time, which must pass through the relay contacts, and can melt them and cause them to fuse. If the relay contacts are fused closed, the run windings will always have the full AC current applied, and can burn out. If the relay contacts are fused open, then the motor will not start.

Due to system rotary inertia, the rotor continues to spin after AC power is removed, and this spin can generate an emf in the run and start windings. Closure of the relay contacts at this time can impose a very high voltage on the start capacitor and can feed a high current through the relay contacts.

In the case of a pressurized load, such as a scroll compressor, there is a tendency for the rotor to spin backwards if power is suddenly removed. This will create another AC voltage source that can contribute to relay contact degradation.

It is a common practice to place a bleed resistor across the start capacitor to dissipate the charge on the capacitor between motor start operations. This bleed resistor typically has a value of about 16 kilohms, which is sufficient for normal operations. However, the discharge time for a large value start capacitor can be several seconds or more, and so the bleed capacitor will not protect the start circuit from capacitive discharge current in the event of a more rapid intermittent application of current to the motor.

OBJECTS AND SUMMARY OF THE INVENTION

Accordingly, it is an object of the present invention to provide an improvement to a motor start circuit that overcomes the above-mentioned drawback(s) of the prior art.

It is another object to provide a motor start circuit with a means for dissipating the charge on the start capacitor in the event of intermittent application of power, and to protect the relay NC contacts from fusing and rendering the motor inoperative.

It is a more specific object to provide a motor start circuit that holds the relay switch open until the charge on the start capacitor has discharged sufficiently.

In accordance with one aspect of the present invention, a motor start circuit is provided for an AC induction motor. The motor includes at least one run winding coupled between a pair of AC power conductors and a start winding. The motor start circuit comprises a start capacitor and a normally closed relay switch connected in series with the start winding and with the first and second AC power conductors. The start capacitor and the relay switch define a junction between each other. This motor start circuit employs a DC actuator circuit, in which a DC actuator coil is magnetically coupled to the relay switch; a rectifier arrangement supplies DC power to the DC actuator coil and has AC inputs coupled to the power conductors (e.g., between the two power conductors or between one of them and one end of the start winding). The rectifier arrangement may preferably include a full-wave rectifier diode bridge, but other rectifier arrangements could be used to provide the DC power to the actuator coil. A half full-wave rectifier circuit has one AC input connected to the junction of the start capacitor with the relay switch, and has DC outputs applied across the actuator coil. Then, in the event of intermittent application of power to the power conductors, any residual charge that remains on the start capacitor will supply the actuator coil. The charge then dissipates through the relay actuator coil, as current to hold the relay switch open. Then, when the charge on the start capacitor has decayed to a small value so that the current will not burn out the relay contacts, the coil releases the relay switch. This arrangement is also effective in discharging through the relay winding any energy that results from the spinning of the rotor after AC power is cut off.

As stated above, in some motors a run capacitor can be connected between the start winding and one of the AC power conductors. Typically, there is a cutoff circuit or control circuit for controlling application and termination of the actuator current from the rectifier arrangement to said actuator coil. This will terminate the start operation under normal load and power quality conditions. Many types of these control circuits exist. As also mentioned before, there may be a discharge device, such as a bleed resistor disposed across the start capacitor to assist in dissipating the residual charge after the relay switch opens.

In a preferred embodiment the half full-wave rectifier circuit includes a series pair of diodes connected anode to cathode. The anode of one is connected to the positive end of the actuator coil and the cathode of the other is connected to the negative end of the coil. The junction of the two diodes then serves as the AC input that is connected to the junction of the relay switch and the start capacitor.

The above and many other objects, features, and advantages of this invention will be more fully appreciated from the ensuing description of certain preferred embodiments, which are to be read in conjunction with the accompanying Drawing.

DETAILED DESCRIPTION OF THE PREFERRED EMBODIMENT

Figure 1:
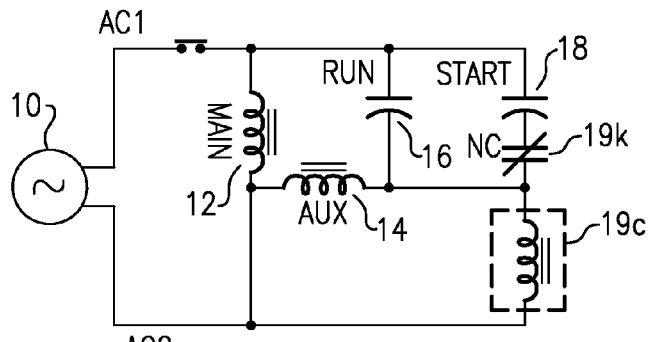
FIG. 1 is an basic schematic view of a relay-based motor start circuit according to the prior art.

With reference now to the Drawing, FIG. 1 shows schematically a motor start arrangement according to the prior art. Here, an AC power source 10 supplies single-phase AC power to a pair of AC power conductors AC1 and AC2. A run winding 12 of the motor armature is connected between these AC power conductors. An auxiliary winding or start winding 14 is shown here with a first end connected to one of the AC power conductors AC2 and at a second end coupled through a run capacitor 16 to the other AC winding AC1. A start capacitor 18 is connected in a series with a normally-closed relay switch 19k between the AC power conductor AC1 and the second end of the auxiliary winding or coil 14. An AC relay actuator coil 19c, which is magnetically coupled to the relay switch 19k, is placed with one end at the junction of the start capacitor 18 and the relay switch 19k and with the other end to the second power conductor AC2. A protective thermal switch S is shown in line in AC power conductor AC1.

In this start circuit, when power is first applied, the NC relay switch 19k is closed, and the start capacitor 18 is connected in series with the start winding or auxiliary winding 14, so that a significant current runs through the winding 14 and creates a high starting torque. Then, as motor speed increases, the voltage across the auxiliary winding increases, so that the voltage across the actuator coil 19c becomes sufficient to open the switch 19k, and cut off the start capacitor. The motor then continues to run normally with power applied through the main winding, and through the run capacitor 16 (which is a much smaller value than the start capacitor 18).

In the event of intermittent application of AC power to the AC power conductors of the motor, i.e., rapid turn on and turn off of power, the start capacitor can be left with a significant voltage across its plates, i.e., as great as +165 volts or −165 volts for standard 110 volt (RMS) single phase AC power. The AC voltage induced from spin of the rotor after disconnect of power can be 400 VAC or higher. The resulting voltage can appear across the start capacitor 18 at the time the AC power is turned off and the relay contact 19k attempts to close. During a normal run cycle, the voltage on the start capacitor will dissipate, but this does not happen if power is cut off during start up, or shortly after start up. In that case, the charge stored on the start capacitor 18 will attempt to discharge through the relatively low impedance run winding and auxiliary winding when the relay switch goes to its normal closed position. This can place an unacceptably high current across the relay contacts, and can burn them out or cause them to fuse closed. Accordingly, some means must be afforded to address this, and typically this involves employing very high temperature relay contacts. However, that has not been sufficient in all instances, and there remains a danger of motor failure due to loss of the start relay.

Figure 2:
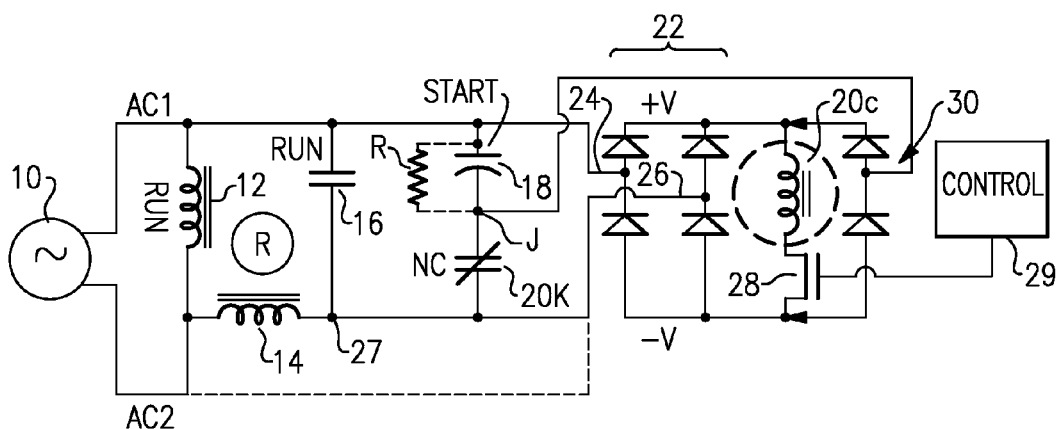
FIG. 2 is a schematic view of a motor start circuit with capacitive discharge protection according to one preferred embodiment of this invention.

An embodiment of a single-phase AC induction motor, incorporating a start circuit arrangement according to an embodiment of the present invention, is shown schematically in FIG. 2. Here, the main elements that were present in the motor shown in FIG. 1 are identified with the same reference numbers. The AC power source 10 provides single-phase power via first and second power conductors AC1 and AC2, and power is applied across the main winding or run winding 12, and also across a series circuit of the run capacitor 16 and start or auxiliary winding 14. The start capacitor 18 is connected in series with a normally-closed or NC contact switch 20k of a DC relay whose DC actuator coil 20c is shown supplied with DC power derived by a full-wave diode bridge rectifier 22. Here, the series combination of the start capacitor 18 and relay switch 20k is connected between the first AC conductor AC1 and the auxiliary winding 14. The start capacitor 16 and the relay switch 20k define a junction J between each other.

The rectifier bridge 22 has a first AC input 24 connected to the first AC power conductor AC1 and a second AC input 26 connected to a junction 27 of the relay switch 20k with the auxiliary winding 14. Alternatively, the second AC input 26 could be connected directly to the second main AC power conductor AC2, as shown in broken line. The rectifier bridge 22 provides DC rail voltage +V to −V for the DC relay actuator coil 20c. Here, a switching transistor 28 is placed in series with the actuator coil, and a control circuit 29 provides gating voltage to the transistor 28 when it detects that the motor has attained sufficient operating speed. The control circuit 29 can employ any of a number of techniques, i.e., motor current detection, time rate of change of current or voltage, rotor shaft speed, or other techniques. In the simplest form of the motor start circuit, the control circuit 29 and transistor 28 would not be needed.

A discharge or bleed resistor R is placed between the two plates of the start capacitor 18. This will typically have a value of about 16 kilohms. If the start capacitor has a typical value of 400 microfarads, this gives an RC time constant of over six seconds, so that it takes about ten full seconds for 90% of the stored charge to dissipate through the bleed resistor R after power is cut off.

A second rectifier arrangement 30 is placed with its AC power input connected to the junction J of the start capacitor 18 with the relay switch 20k, and with DC outputs connected across the actuator coil 20c. This ensures that if the motor power is switched on and off rapidly and intermittently, such that there is a significant amount of charge stored on the capacitor 18 when the main power is cut off from the power conductors AC1 and AC2, current will flow from the capacitor 18 through the rectifier arrangement 30 to the actuator coil 20c. This gives the capacitor 18 another discharge path, to reduce the time of discharge of the capacitor 18. In addition the current through the coil 20c will continue to keep the relay contact 20k pulled in, i.e., in its off condition, until the stored charge on the start capacitor 18 has dissipated, and for all system rotary inertial energy also to be dissipated.

Figure 3:
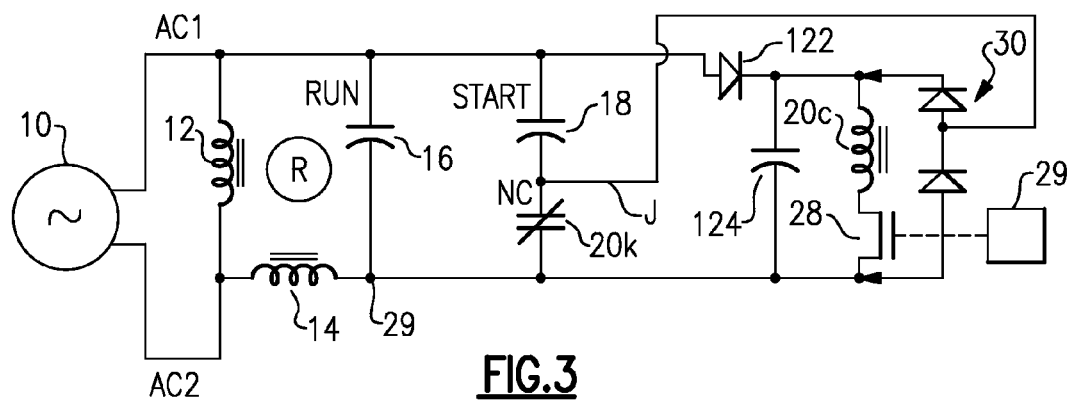
FIG. 3 is a schematic view of a second embodiment.

An alternative embodiment is shown in FIG. 3, in which elements that were previously described in the embodiment of FIG. 2 are identified with the same reference numbers. The FIG. 3 embodiment employs a half-wave rectifier for the supply of direct current power to the relay actuator coil 20c (and to the control circuit 29). Here, the rectifier is comprised of a diode having its cathode connected to the first AC power conductor AC1, and its cathode connected to a positive plate of a capacitor 124, whose other plate is connected, e.g., to the junction 27, i.e., to one end of the auxiliary winding 14. The DC power supply could take on many other forms besides that which is shown here. The second rectifier arrangement 30 is here shown as a series pair of diodes as in the FIG. 2 embodiment. This second rectifier arrangement could be configured in other ways, but should function as a half full-wave rectifier, so that either a positive or negative voltage at the junction J will result in continued DC voltage to the coil 20c to hold the relay contact 20k in its open position until the charge on the start capacitor 18 (plus any electric charge that is generated from the system rotational inertial energy) has dissipated sufficiently. The alternative arrangement shown in dash lines in FIG. 2 is also possible in this embodiment.

Figure 4:
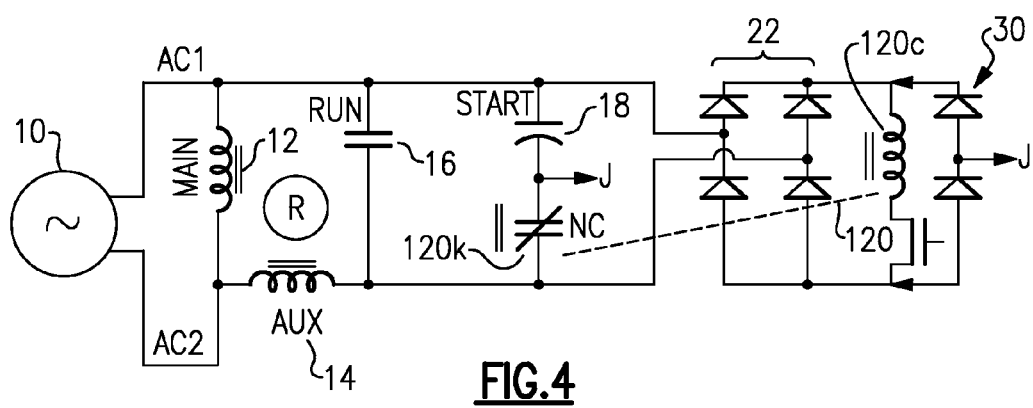
FIG. 4 is a schematic view of a third embodiment of the present invention.

Another possible embodiment of this invention is shown in FIG. 4. Here, elements that have been previously described in reference to the FIG. 2 embodiment are identified with the same reference numbers, and need not be described in detail again. In this embodiment, a DC relay 120 having a high magnetic retentivity core in its actuator 120c is employed. That is, the relay 120 has the effect that once the relay switch 120k is pulled in (to its off condition), the relay will remain in that state for a short time after current ceases, until the magnetism of the core has decayed. This can provides a several seconds, more or less, of protection from capacitive discharge of the start capacitor 18, and this is usually sufficient time for the charge to decay through the normal pathways, such as through the discharge resistor R. In one preferred embodiment, the magnetic retentivity of the relay core can hold the relay switch in its off condition, and release it after a time of approximately ten seconds. Depending on the motor, the applied power, and the size of the start capacitor, this hold time may be as long sixty seconds to a few minutes. In normal operation, the relay will release while the motor is running normally. However, if power is switched on and off, the delay from the high retentivity core will take effect.

While the invention has been described with reference to specific preferred embodiments, the invention is certainly not limited to those precise embodiments. Rather, many modifications and variations will become apparent to persons of skill in the art without departure from the scope and spirit of this invention, as defined in the appended claims.

I claim:

1. Motor start circuit for an AC induction motor, said motor including at least one run winding coupled between a pair of AC power conductors and a start winding; and said motor start circuit comprising:
    a start capacitor and a normally closed relay switch connected in series with said second start winding and said first and second AC power conductors, with said start capacitor and said relay switch defining a junction therebetween; and
    a DC actuator circuit which includes
        a DC actuator coil magnetically coupled to said relay switch;
        a rectifier arrangement supplying DC power to said DC actuator coil and having AC inputs coupled to said power conductors; and
        a half full-wave rectifier circuit having an AC input connected to the junction of said start capacitor and said relay switch and DC outputs applied across said actuator coil such that in the event of intermittent application of power to said power conductors, any residual charge on said start capacitor will supply current to said actuator coil to hold the relay switch open until said residual charge has decayed.

2. Motor start circuit for an AC induction motor according to claim 1, further comprising a run capacitor connected between said start winding and one of said AC power conductors.

3. Motor start circuit for an AC induction motor according to claim 1, further comprising a control circuit for controlling application and termination of the actuator current from said rectifier arrangement to said actuator coil.

4. Motor start circuit for an AC induction motor according to claim 1, further comprising a bleed resistor disposed across said start capacitor to assist in dissipating residual charge thereon.

5. Motor start circuit for an AC induction motor according to claim 1, wherein said half full-wave rectifier circuit includes a series pair of diodes connected anode to cathode.

6. Motor start circuit for an AC induction motor, said motor including at least one run winding coupled between first and second power conductors and a start winding, said motor start circuit comprising:
    a start capacitor and a normally-closed relay switch connected in series between said start winding and said first and second AC power conductors, one end of said start winding being connected to said second AC power conductor, and said start capacitor and said switch being connected between a second end of said start winding and the first AC power conductor; the start capacitor and the relay switch defining a junction therebetween; and
    a DC actuator circuit including
        a DC actuator coil magnetically coupled to said relay switch;
        a rectifier arrangement supplying DC power to said DC actuator coil and having AC inputs coupled between the second end of the start winding and the first AC power conductor; and
        a half full-wave rectifier circuit having an AC input connected to the junction of said start capacitor and said relay switch and DC outputs applied across said actuator coil, such that in the event of intermittent application of power to said AC power conductors, any residual charge on said start capacitor will supply current to said actuator coil to hold the relay switch open until said residual charge has decayed.

7. Motor start circuit for an AC induction motor according to claim 6, further comprising a run capacitor connected between said start winding and one of said AC power conductors.

8. Motor start circuit for an AC induction motor according to claim 6, further comprising a control circuit for controlling application and termination of the actuator current from said rectifier arrangement to said actuator coil.

9. Motor start circuit for an AC induction motor according to claim 6, further comprising a bleed resistor disposed across said start capacitor to assist in dissipating residual charge thereon.

10. Motor start circuit for an AC induction motor according to claim 6, wherein said half full-wave rectifier circuit includes a series pair of diodes connected anode to cathode.

11. Motor start circuit for an AC induction motor, said motor including at least one run winding coupled between first and second power conductors and a start winding, said motor start circuit comprising:

a start capacitor and a DC relay having a DC relay actuator coil and a normally-closed relay switch; said relay switch being connected in series with said start capacitor between said start winding and said first and second AC power conductors, said DC relay actuator coil being magnetically coupled to said relay switch; one end of said start winding being connected to said second AC power conductor, and said start capacitor and said switch being connected between a second end of said start winding and the first AC power conductor; and a DC actuator circuit including said DC relay actuator coil; and a rectifier arrangement supplying DC power to said DC actuator coil and having AC inputs obtaining power from said first and second AC power conductors; and the improvement wherein said relay actuator coil includes a ferromagnetic core having a magnetic retentivity sufficient to hold the normally-closed relay switch in an off condition for a period of time after loss of said DC power to the actuator, such that in the event of intermittent application of power to said AC power conductors, residual energy appearing on said start capacitor will dissipate before the normally-closed relay switch is released to its closed condition.

12. Motor start circuit according to claim 11, wherein period of time that said ferromagnetic core holds the normally-closed relay switch in its off condition is at least ten seconds.

* * * * *